Figure 1:
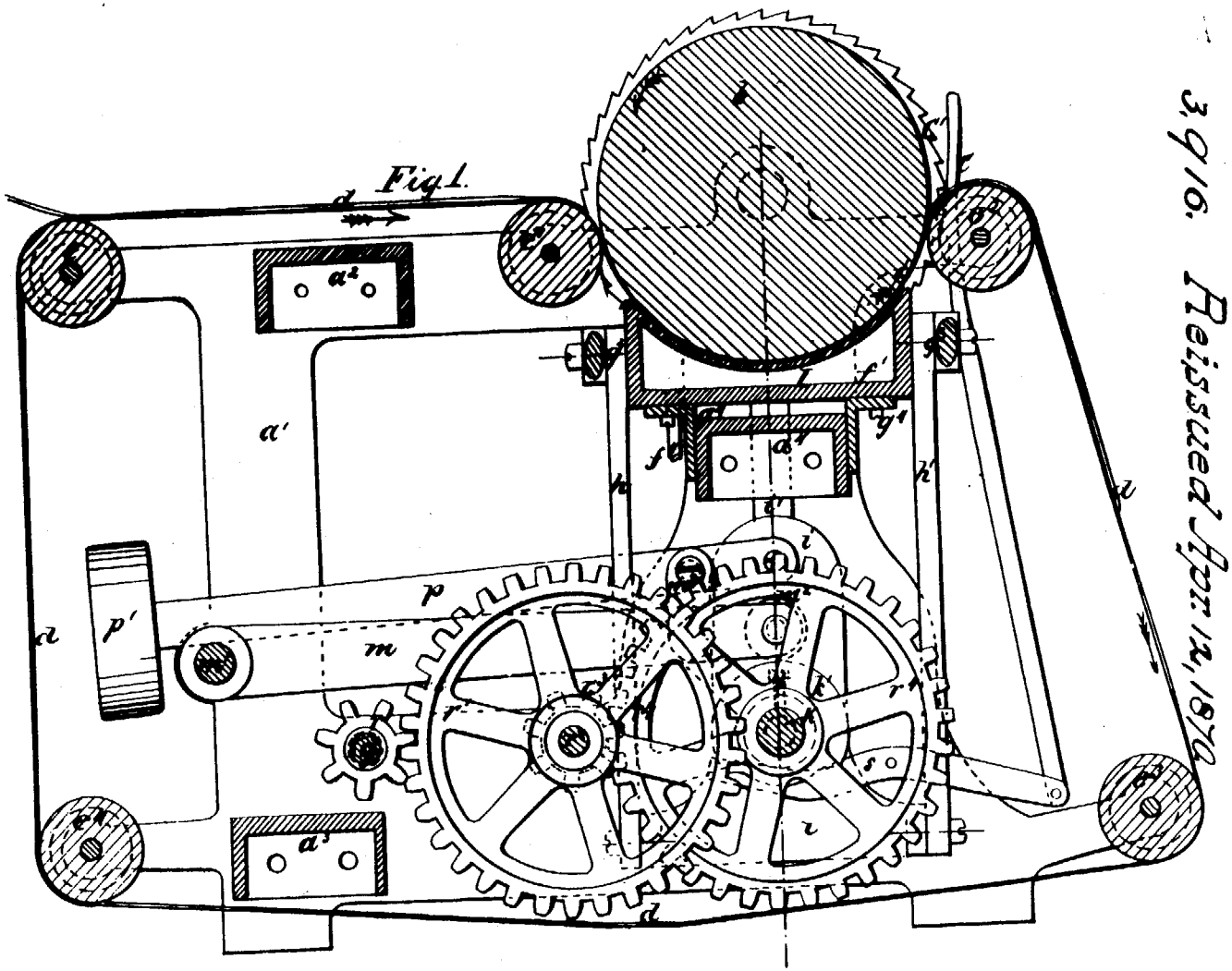

BEST AVAILABLE COPY

R. Eickemeyer. Sheet 1, 3 Sheets.

Felting Mach.

3,916. Reissued Apr. 12, 1870.

Witnesses

Gustav Kaster

Theodore Fitch

Inventor

Rudolf Eickemeyer

N. PETERS, PHOTO-LITHOGRAPHER, WASHINGTON, D. C.

R. Eickemeyer. Sheet 2, 3 Sheets.

Felting Mach.

No. 3,916. Reissued Apr. 12, 1870.

Witnesses

Gustav Kaster

Theodore Ritch

Inventor

Rudolf Eickemeyer

H. PETERS, PHOTO-LITHOGRAPHER, WASHINGTON, D. C.

R. Eickemeyer. Sheet 3, 3 Sheets.

Felting Mach.

No. 3,916. Reissued Apr. 12, 1870.

Witnesses

Gustav Kaster

Theodore Stitch

Inventor

Rudolf Eickemeyer

N. PETERS, PHOTO-LITHOGRAPHER, WASHINGTON, D. C.

UNITED STATES PATENT OFFICE.

RUDOLF EICKEMEYER, OF YONKERS, NEW YORK, ASSIGNOR TO JOHN T. WARING.

IMPROVEMENT IN FELTING-MACHINES.

Specification forming part of Letters Patent No. 87,763, dated March 16, 1869; Reissue No. 3,916, dated April 12, 1870.

*To all whom it may concern:*

Be it known that I, RUDOLF EICKEMEYER, of Yonkers, in the county of Westchester and State of New York, have invented certain new and useful Improvements in Machinery for Felting Felt Cloths; and I do hereby declare that the following is a full and correct description thereof, reference being had to the accompanying drawings, and to the letters of reference thereon.

The object of my invention is to felt and finish felt cloths at one operation by a jiggering-machine, and without preliminary hardening and subsequent fulling in a fulling-mill before finishing, as heretofore practiced in the manufacture of felt cloth.

To this end I have improved the jiggering-machine—

First. By giving a greatly-increased but determinate pressure to the felt while under the action of the jigger.

Second. By releasing the felt from the grasp of the felting-surfaces at regular intervals and advancing it a short distance at a time as compared with the width of the jigger-plate, so that all parts of the felt may be equally acted upon by all parts of the jigger-plate.

Third. By lines, figures, or patterns cut, engraved, or otherwise formed in the felting-surface of the machine which is in contact with the finished side of the felt cloth while felting it, so that the felt may be finished with lines, figures, or patterns (continuous or otherwise) felted in its surface during the operation of felting.

Fourth. In making the platen cylindrical and the jigger-plate correspondingly concave, so that the felt may be advanced, when released from the grasp of the felting-surfaces, without releasing it from the metal surface of the platen, which turns on its axis as the fabric is advanced. This gives the machine capacity to felt a finished felt cloth having a continuous pattern of lines or figures felted on its surface.

Fifth. In combining with the cylindrical platen or felting-cylinder and the concave jiggering apparatus a carrying-cloth passing between them, upon which the bat is carried.

In another specification I have described a similar concave jiggering apparatus with a similar carrying-cloth applied to a cylindrical "tuft-holder," but that machine not being suitable for felting ordinary plain and ornamental felt cloths by reason of the tuft-holes, I have in this invention combined the concave jiggering apparatus and carrying-cloth with a proper felting cylinder, to make a simple and effective machine for felting plain and ornamental felt cloths. The cylinder in this machine should, however, be scored circumferentially, to lay hold of the fibers of the bat or the covering-cloth, should a covering-cloth be used, so as to grasp the bat effectively when felting it. When the scoring is fine and in parallel lines around the cylinder, the finished felt cloth presents the appearance of a woven fabric, the lines being felted continuously and unbroken in the surface.

If it is desired to produce felt cloth in this machine without a finish of lines or figures, a covering-cloth of the usual non-felting materials for a covering or "hardening-cloth" may be placed over the fabric, which will thereby be protected from the scored lines of the cylinder with which it would otherwise be in direct contact.

The covering-cloth should be of suitable non-felting material for a carrying-cloth or hardening-cloth in a felting-machine. It, however, adheres, by reason of the felting process, to the felted fabric sufficiently to be carried with it by the adhesion of the latter to the surface of the felting-cylinder, and is moved along by the intermittent forward movement of the surface of the felting-cylinder, and consequently, if desired, a woven cloth of felting or non-felting materials may be felted to the back of the felted fabric, while the latter is being felted by passing it through the machine upon the carrying-cloth, with the bat for the felted fabric. For this purpose the machine may, however, be used without the endless carrying-cloth. The woven back, being a sufficient support for the bat, may be drawn into the machine from a roller, as heretofore practiced in jiggering-machines.

It will be obvious from an examination of this machine that all kinds of patterns capable of being lined or engraved or otherwise formed upon the cylinder of this machine will be correspondingly reproduced in the surface of the felted fabric by the operation of felting.

Figure 2:
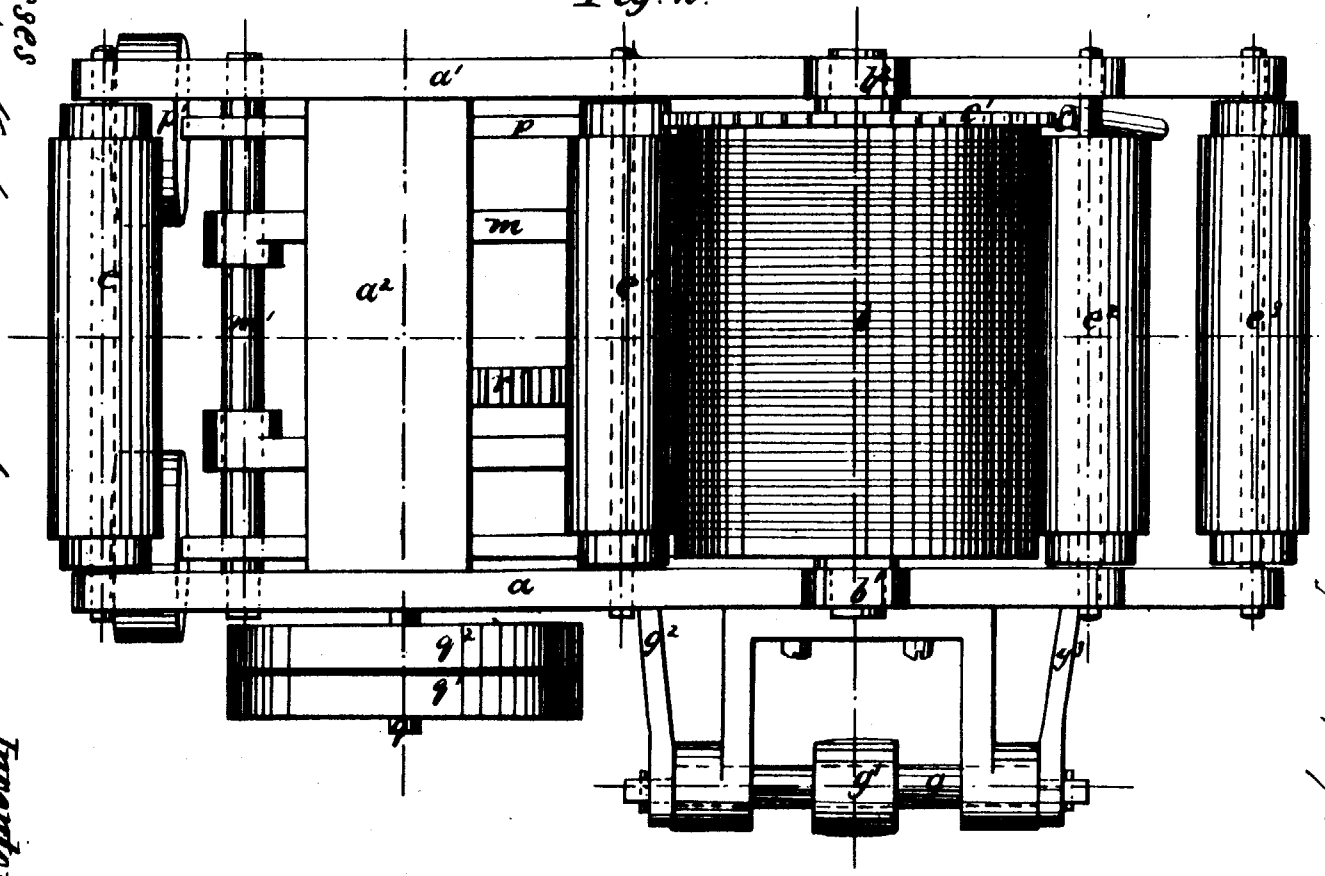
Figure 3:
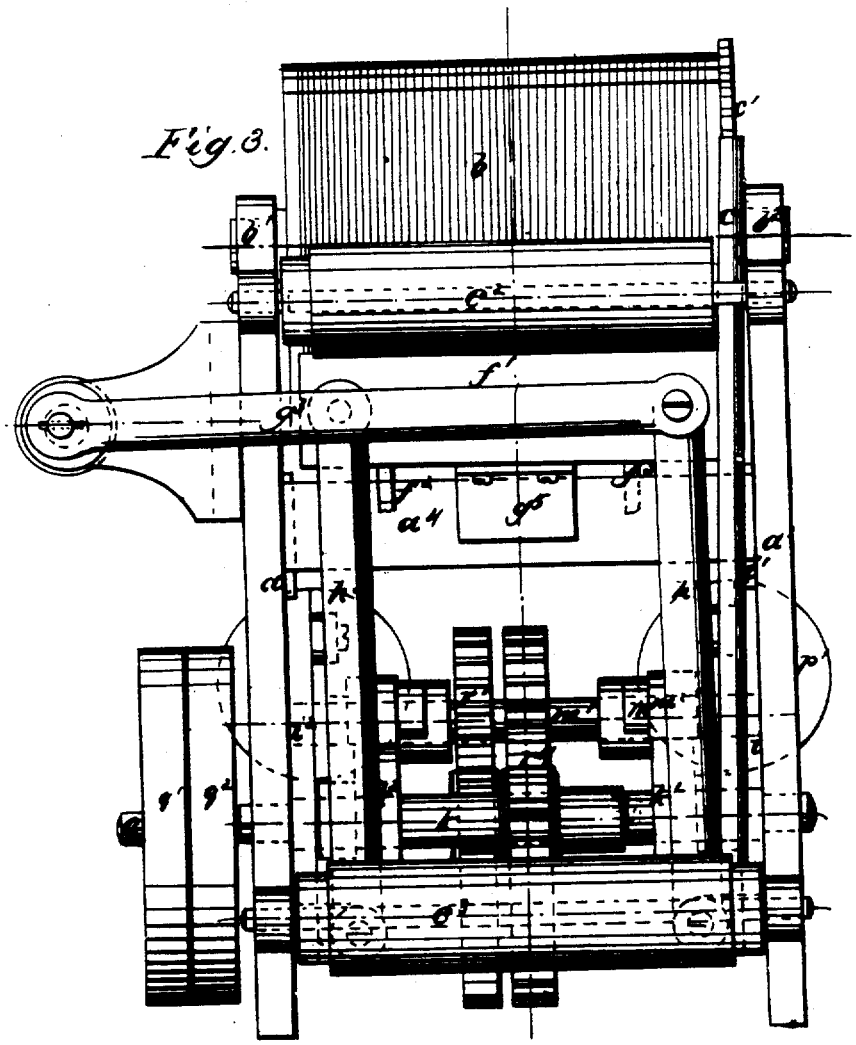

Figure 1 of the drawings represents a vertical longitudinal section of my improved machine; Fig. 2, a plan view, and Fig. 3 an end elevation of the same.

The side frames, $a$ $a'$, of the machine are framed together by the cross-braces $a^2$ $a^3$ $a^4$.

The felting-cylinder $b$ is mounted horizontally in fixed bearings $b'$ $b^2$ in the side frames, and is moved intermittently in the directions indicated by the arrows by a pawl, $c$, and ratchet-wheel $c'$, the latter attached to the shaft of the felting-cylinder. The felting-cylinder should, preferably, be made hollow, of iron or other suitable metal, and have hollow shafts, by which steam can be introduced within for the purpose of warming it, if desired, as in calender-rollers. The surface should be slightly scored or grooved circumferentially to hold the fabric while felting against the action of the jigger.

The carrying-cloth $d$ is an endless apron or conductor of linen canvas or other suitable material, extended over the drums $e$ $e'$ $e^2$ $e^3$ $e^4$, the two drums $e'$ $e^2$ being placed one each side of the felting-cylinder in such manner as to wrap the portion of the carrying-cloth around the lower half of the surface of the felting-cylinder, so that when the felting-cylinder is moved the carrying-cloth moves with it and conducts the prepared fabric to and from the felting-cylinder, holding it to the felting-cylinder while the jigger is in action.

The jiggering or rubbing plate by which the felting is accomplished is a concave metal plate, $f$, which forms the top plate of a steam-box, $f'$. This concave plate is of a curvature corresponding to that of the felting-cylinder, and is perforated with fine holes, to permit steam to pass to the fabric to be felted through the carrying-cloth.

The steam-box $f'$ has suitable induction and eduction pipes, $f^2$ $f^3$, (shown broken off,) which should be connected by flexible connecting-pipes with a source of supply of steam and a waste-water receptacle. This steam-box, with its concave rubbing-surface, is placed immediately under the felting-cylinder and that portion of the carrying-cloth in contact therewith, and receives a very short and exceedingly rapid motion from the eccentric-shaft $g$, which may be driven, as usual, by a rapid belt from a separate counter-shaft overhead running upon the driving-pulley $g'$, and is connected with the steam-box $f'$ by two connecting-rods, $g^2$ $g^3$.

At each side of the jiggering steam-box are guides $g^4$ $g^5$, which constrain it to vibrate in a direction transverse to the cylinder, but do not interfere with its being moved toward and from the felting-cylinder. The steam-box and its concave jiggering-surface are moved up and down, and held against the carrying-cloth and felting-cylinder with great force by a determinate yielding pressure by mechanism as follows, viz: The steam-box is supported by four rocking columns, two of which, $h$ $h'$, are connected by joints to lugs or projections from the lower part of a sliding plate, $i$, which slides up and down within the frame upon the side frame, $a'$ the upper part of the sliding plate $i$ having a guide-bar, $i'$, projecting upward from it, which slides in a recess in the end of the cross-brace $a^4$, the lower part of the sliding plate being guided by the cam-shaft, which passes through a slot made in the middle of the lower part of the plate for that purpose; and the other two columns (one only, $h^3$, shown in the drawings) are similary connected to an opposite sliding plate, $i^2$, which slides up and down upon the opposite side frame in the same manner as the sliding plate $i$. The two opposite sliding plates, $i$ and $i^2$ are exactly alike, facing each other in opposite sides of the machine within the side frames, and are each independently moved up and down at the same time by means of cams $k'$ $k$ past to the cam-shaft $k$, operating through two systems of weights and levers, one system for each sliding plate. The two systems of weighted levers being alike, a description of one only will be given—that which is in connection with the cam $k'$ and the sliding plate $i$. This system of levers consists of a lever, $m$, pivoted upon the cross-shaft $m'$, and extending horizontally to the cam $k$, being provided at the end with an anti-friction roller, $m^2$, which runs on the cam $k'$. The lever $m$ is linked by a short link, $m^3$, to the fulcrum-point of a lever, $p$, immediately above it, which lever is connected to the sliding plate $i$ at one end and is loaded with weights $p'$ at the other end. The arrangement and proportions of the levers being as shown in the drawings, the cam lifts the sliding plate and its end of the steam-box by lifting the weighted lever $p$. When the cam turns to lower the sliding plate, the weighted lever $p$ rests on the cross-shaft $m$ close by the weights, and relieves the sliding plate and steam-box from the upward pressure due to the weights, permitting the steam-box to be lowered sufficiently to allow the felting-cylinder to be moved. The weights should be so proportioned to the leverage and felting-surface as to give from three hundred to seven hundred pounds pressure per square foot of felting-surface of the jigger. The maximum pressure in jiggering-machines as heretofore used is about seventy pounds per square foot of felting-surface. The rotating cam-shaft $k$ is driven by a train of cog-wheels from the driving-shaft $q$, upon which are the fast and loose pulleys $q'$ $q^2$, as follows, viz: A pinion, $r$, fast to the driving-shaft $q$ gears into a spur-wheel, $r'$, fast to the intermediate rotating shaft $r^2$, which also carries a pinion, $r^3$, which gears into the spur-wheel $r^4$ fast to the cam-shaft. The exact proportions of these wheels are not material, as they are merely used to reduce the speed and increase the power from the light driving-belt. The pawl $c$, which moves the felting-cylinder, is actuated by the lever $s$, to which it is connected, the lever being moved the proper distance by a wiper in the form of a set-screw, *t*, screwed into the cam-shaft *k*.

The operation of the machine is as follows: The prepared fabric, being fed upon the carrying-cloth continuously, is carried by it to the felting-cylinder, the latter having an intermittent progressive motion and held to the surface of the cylinder. The cylinder being at rest, the vibrating concave jigger rises and presses against the under side of the carrying-cloth with a heavy determinate yielding pressure, and, being at the same time in rapid motion and supplied with steam, affords the requisite motion, heat, moisture, and pressure to felt the fabric, or partially felt, the fabric while in action, and the cylinder being moved the distance of only one tooth of the ratchet, or a very short distance at a time, the concave jigger repeats its action upon the greater part of the fabric it had previously acted upon, thus progressively felting the fabric as it passes through the machine.

The fabric adheres to the felting-cylinder and carrying-cloth sufficiently for the purpose of feeding; but, should it be desired, a ratchet-feed can readily be attached to one of the carrying-drums of the carrying-cloth, or either one or both of the drums next to the felting-cylinder may be geared with it by cog-wheels.

The concave rubbing-plate should be slightly grooved or scored in a direction opposite to that of its vibration, so as to take hold of the carrying-cloth.

I claim in a jiggering-machine for felting felt-cloth—

1. In combination with the felting-surfaces which grasp the cloth between them in the operation of felting, the weighted levers, substantially as described, whereby a determinate but yielding pressure may be applied with great force through the felting-surfaces to the fabric without encumbering the jigger motion with a heavily-weighted jigger.

2. In combination with felting-surfaces whose grasp upon the felt cloth is automatically released at regular intervals, an automatic mechanism to advance the felt cloth when the felting-surfaces are released, substantially as described.

3. In combination with felting-surfaces whose grasp upon the felt cloth is released automatically at regular intervals, automatic mechanism for advancing the felt cloth when regulated with respect to the width of the jigger-plate, so as to advance the felt but a short distance at a time as compared with the width of the jigger-plate, substantially as described, whereby all parts of the felt are acted upon equally by all parts of the felting-surfaces.

4. In a felting-machine for felting cloths, the combination of a jigger-plate with a platen in whose surface-lines figures or other pattens are cut, engraved, or otherwise formed, substantially as described, whereby the felt may be finished with lines, figures, or patterns continuous or otherwise, felted in its surface during the operation of felting.

5. The cylindrical platen or felting-cylinder with scored or roughened surface, in combination with the concave jigger-plate, substantially as described, whereby the felt may be advanced when released from the action of the jigger without separating it from the cylinder, thus insuring accurate patterns.

6. The carrying-cloth, in combination with the concave jiggering apparatus and felting-cylinder, substantially as described.

RUDOLF EICKEMEYER.

Witnesses:

FILLMORE DUTCHER,
I. P. SANDERS.